US009223869B2

(12) United States Patent
Bennett

(10) Patent No.: US 9,223,869 B2
(45) Date of Patent: Dec. 29, 2015

(54) BROWSER BASED LANGUAGE RECOGNITION SUPPORTING CENTRAL WEB SEARCH TRANSLATION

(71) Applicant: RPX CORPORATION, San Francisco, CA (US)

(72) Inventor: James D. Bennett, Hroznetin (CZ)

(73) Assignee: RPX CORPORATION, San Francisco, CA (US)

( * ) Notice: Subject to any disclaimer, the term of this patent is extended or adjusted under 35 U.S.C. 154(b) by 0 days.

(21) Appl. No.: 13/665,340

(22) Filed: Oct. 31, 2012

(65) Prior Publication Data

US 2013/0124498 A1    May 16, 2013

Related U.S. Application Data

(63) Continuation of application No. 12/437,607, filed on May 8, 2009.

(60) Provisional application No. 61/053,708, filed on May 16, 2008.

(51) Int. Cl.
*G06F 17/20* (2006.01)
*G06F 17/30* (2006.01)
*G06F 17/27* (2006.01)
*G06F 17/28* (2006.01)

(52) U.S. Cl.
CPC ........ *G06F 17/30864* (2013.01); *G06F 17/275* (2013.01); *G06F 17/289* (2013.01); *G06F 17/30905* (2013.01)

(58) Field of Classification Search
CPC ..................................... G06F 17/289

USPC ......................................................... 704/1–9
See application file for complete search history.

(56) References Cited

U.S. PATENT DOCUMENTS

| | | | |
|---|---|---|---|
| 4,882,675 A | 11/1989 | Nichtberger et al. | |
| 5,062,143 A * | 10/1991 | Schmitt | 382/230 |
| 5,239,462 A | 8/1993 | Jones et al. | |
| 5,339,392 A | 8/1994 | Risberg et al. | |
| 5,729,693 A | 3/1998 | Holda-Fleck | |
| 5,732,400 A | 3/1998 | Mandler et al. | |
| 5,765,144 A | 6/1998 | Larche et al. | |
| 5,797,133 A | 8/1998 | Jones et al. | |
| 5,903,721 A | 5/1999 | Sixtus | |
| 5,937,391 A | 8/1999 | Ikeda et al. | |
| 5,940,811 A | 8/1999 | Norris | |
| 5,943,424 A | 8/1999 | Berger | |
| 5,963,915 A | 10/1999 | Kirsch | |
| 5,984,180 A | 11/1999 | Albrecht | |

(Continued)

*Primary Examiner* — Shaun Roberts
(74) *Attorney, Agent, or Firm* — Howison & Arnott, LLP

(57) ABSTRACT

A web browser agent or plug-in installed into a web browser of a client device provides translation services along with a search engine server. The system accesses a web page in one (local) language and then translates to another (foreign) language and displays the translated content in a web page for user's viewing. The web browser agent is an add-on software tool or plug-in, provided by the search engine server and installed into the web browser. As a result of installation, a toolbar appears on the top of the web browser's page. This toolbar provides the interface to enable local translation of web pages from a local/web language to a target/foreign language useful to the user. Centralized (cloud computing) translation services by servers of a third party may also be employed. Web pages in any number of languages may be accessed using this operations/structure.

28 Claims, 8 Drawing Sheets

(56) References Cited

U.S. PATENT DOCUMENTS

| | | |
|---|---|---|
| 6,009,412 A | 12/1999 | Storey |
| 6,014,645 A | 1/2000 | Cunningham |
| 6,029,149 A | 2/2000 | Dykstra et al. |
| 6,052,674 A | 4/2000 | Zervides et al. |
| 6,055,513 A | 4/2000 | Katz |
| 6,055,514 A | 4/2000 | Wren |
| 6,064,951 A * | 5/2000 | Park et al. .................... 704/8 |
| 6,088,686 A | 7/2000 | Walker et al. |
| 6,141,006 A | 10/2000 | Knowlton et al. |
| 6,141,915 A | 11/2000 | Anderson et al. |
| 6,144,948 A | 11/2000 | Walker et al. |
| 6,167,385 A | 12/2000 | Hartley-Urquhart |
| 6,175,922 B1 | 1/2001 | Wang |
| 6,208,979 B1 | 3/2001 | Sinclair |
| 6,233,566 B1 | 5/2001 | Levine et al. |
| 6,236,975 B1 | 5/2001 | Boe et al. |
| 6,285,983 B1 | 9/2001 | Jenkins |
| 6,289,319 B1 | 9/2001 | Lockwood |
| 6,311,169 B2 | 10/2001 | Duhon |
| 6,324,521 B1 | 11/2001 | Shiota et al. |
| 6,324,524 B1 | 11/2001 | Lent et al. |
| 6,370,514 B1 | 4/2002 | Messner |
| 6,385,568 B1 * | 5/2002 | Brandon et al. ............... 704/7 |
| 6,385,591 B1 | 5/2002 | Mankoff |
| 6,385,594 B1 | 5/2002 | Lebda et al. |
| 6,393,436 B1 | 5/2002 | Vaimberg-Araujo |
| 6,405,181 B2 | 6/2002 | Lent et al. |
| 6,405,281 B1 | 6/2002 | Akerib |
| 6,434,607 B1 | 8/2002 | Haverstock et al. |
| 6,453,306 B1 | 9/2002 | Quelene |
| 6,466,981 B1 | 10/2002 | Levy |
| 6,477,575 B1 | 11/2002 | Koeppel et al. |
| 6,477,580 B1 | 11/2002 | Bowman-Amuah |
| 6,484,149 B1 | 11/2002 | Jammes et al. |
| 6,505,773 B1 | 1/2003 | Palmer |
| 6,507,823 B1 | 1/2003 | Nel |
| 6,530,880 B2 | 3/2003 | Pagliuca |
| 6,567,791 B2 | 5/2003 | Lent et al. |
| 6,571,241 B1 * | 5/2003 | Nosohara ........................ 1/1 |
| 6,587,841 B1 | 7/2003 | Defrancesco et al. |
| 6,594,640 B1 | 7/2003 | Postrel |
| 6,611,816 B2 | 8/2003 | Lebda et al. |
| 6,615,253 B1 | 9/2003 | Bowman-Amuah |
| 6,658,393 B1 | 12/2003 | Basch et al. |
| 6,684,196 B1 | 1/2004 | Mini et al. |
| 6,735,572 B2 | 5/2004 | Landesmann |
| 6,766,302 B2 | 7/2004 | Bach |
| 6,785,661 B1 | 8/2004 | Mandler et al. |
| 6,795,812 B1 | 9/2004 | Lent et al. |
| 6,847,942 B1 | 1/2005 | Land et al. |
| 6,857,022 B1 * | 2/2005 | Scanlan .................... 709/229 |
| 6,868,395 B1 | 3/2005 | Szlam et al. |
| 6,895,388 B1 | 5/2005 | Smith |
| 6,898,570 B1 | 5/2005 | Tedesco et al. |
| 6,915,271 B1 | 7/2005 | Meyer et al. |
| 6,928,412 B2 | 8/2005 | DeBiasse |
| 6,934,692 B1 | 8/2005 | Duncan |
| 6,950,807 B2 | 9/2005 | Brock |
| 6,957,192 B1 | 10/2005 | Peth |
| 6,970,852 B1 | 11/2005 | Sendo et al. |
| 6,988,085 B2 | 1/2006 | Hedy |
| 7,010,508 B1 | 3/2006 | Lockwood |
| 7,013,289 B2 | 3/2006 | Horn et al. |
| 7,047,219 B1 | 5/2006 | Martin et al. |
| 7,069,234 B1 | 6/2006 | Cornelius et al. |
| 7,082,412 B1 | 7/2006 | Treider et al. |
| 7,095,513 B2 * | 8/2006 | Stringham .................. 358/1.13 |
| 7,096,354 B2 | 8/2006 | Wheeler et al. |
| 7,103,568 B1 | 9/2006 | Fusz et al. |
| 7,133,935 B2 | 11/2006 | Hedy |
| 7,143,063 B2 | 11/2006 | Lent et al. |
| 7,165,051 B2 | 1/2007 | Ronning et al. |
| 7,171,371 B2 | 1/2007 | Goldstein |
| 7,181,427 B1 | 2/2007 | DeFrancesco et al. |
| 7,194,436 B2 | 3/2007 | Tammaro |
| 7,219,080 B1 | 5/2007 | Wagoner et al. |
| 7,249,097 B2 | 7/2007 | Hutchison et al. |
| 7,289,964 B1 | 10/2007 | Bowman-Amuah |
| 7,310,617 B1 | 12/2007 | Cunningham |
| 7,353,192 B1 | 4/2008 | Ellis et al. |
| 7,363,267 B1 | 4/2008 | Vincent et al. |
| 7,376,603 B1 | 5/2008 | Mayr et al. |
| 7,395,259 B2 | 7/2008 | Bailey et al. |
| 7,412,388 B2 * | 8/2008 | Dalal et al. .................. 704/260 |
| 7,505,939 B2 | 3/2009 | Lent et al. |
| 7,539,628 B2 | 5/2009 | Bennett et al. |
| 7,542,922 B2 | 6/2009 | Bennett et al. |
| 7,610,221 B2 | 10/2009 | Cella et al. |
| 7,627,531 B2 | 12/2009 | Breck et al. |
| 7,630,986 B1 | 12/2009 | Herz et al. |
| 7,660,751 B2 | 2/2010 | Cella et al. |
| 7,660,752 B2 | 2/2010 | Cella et al. |
| 7,729,959 B1 | 6/2010 | Wells et al. |
| 7,742,966 B2 | 6/2010 | Erlanger |
| 7,769,681 B2 | 8/2010 | Misraje et al. |
| 7,890,493 B2 * | 2/2011 | Chen ........................... 707/713 |
| 7,908,226 B2 | 3/2011 | Hutchison et al. |
| 7,917,488 B2 * | 3/2011 | Niu et al. .................... 707/706 |
| 7,938,316 B2 | 5/2011 | Bennett et al. |
| 7,942,316 B2 | 5/2011 | Bennett et al. |
| 7,958,446 B2 * | 6/2011 | Seitz et al. .................. 715/249 |
| 8,036,941 B2 | 10/2011 | Bennett et al. |
| 8,117,120 B2 | 2/2012 | Misraje et al. |
| 8,145,563 B2 | 3/2012 | Misraje et al. |
| 8,177,124 B2 | 5/2012 | Bennett et al. |
| 8,181,851 B2 | 5/2012 | Bennett et al. |
| 2001/0029455 A1 * | 10/2001 | Chin et al. .................. 704/277 |
| 2002/0052778 A1 | 5/2002 | Murphy |
| 2002/0099533 A1 * | 7/2002 | Jaqua ............................. 704/1 |
| 2004/0122656 A1 * | 6/2004 | Abir ............................... 704/4 |
| 2006/0271349 A1 * | 11/2006 | Scanlan ......................... 704/2 |
| 2008/0120087 A1 * | 5/2008 | Scanlan ......................... 704/2 |
| 2009/0024595 A1 * | 1/2009 | Chen ............................. 707/4 |

* cited by examiner

Webseite des IIP Services (www.iipservices.com) 511

Übersetzen Sie zur englischen|Multi-Sprachenübersetzung am Bediener|Wählen Sie Sprache Vor:

IIP Service's Web Page (www.iipservices.com) → (Translated Web Page) 521   549

|Translate to English|  |Multi-Language Translation at Server|  Select Language   551

*IIP SERVICES.COM* 541

Translated Text (From *German* to English): 555

With a global presence, IIP Services provides superior patent preparation services for companies that commercialize electrical engineering technology. Unlike other outsourcing providers, we employ an innovative process working with each company's domestic patent professionals and inventors to deliver only the highest quality patents at significant cost savings.

IIP Services has Senior Technologists who have drafted several patent applications in a variety of technical subjects for research oriented groups of leading-edge companies in the wireless and mobile computing industry. In particular, IIP Services has helped companies patent concepts related to 3G, 802.11, mobile computing, network infrastructure, device management, content delivery and other research topics. 557

Prev  585      Next  589

Done

Client's Browser 595

FIG. 5

BROWSER BASED LANGUAGE RECOGNITION SUPPORTING CENTRAL WEB SEARCH TRANSLATION

CROSS REFERENCE TO RELATED APPLICATIONS

The present application is a continuation of U.S. Ser. No. 12/437,607 filed May 8, 2009, which claims priority under 35 U.S.C. 119(e) to U.S. Provisional Application Ser. No. 61/053,708, filed May 16, 2008, both of which are incorporated herein by reference in their entirety for all purposes.

BACKGROUND

1. Technical Field

The present invention relates generally to Internet infrastructures, and more particularly to search engines.

2. Related Art

Search engines provide an added useful feature to the Internet by providing access to a wide variety of web pages, which would otherwise have had very limited access and use. Thus, the search ability of the Internet makes the Internet a very progressive and successful computer network worldwide. Many web sites (or web pages) often are totally unknown to the general user population and these sites having a very small potential (if any) to advertise. Yet, these web sites are potentially very informative and useful to the users, and users can gain quick access to these sites worldwide via various search engines. Thus, both the user population and web sites on the Internet benefit from the services provided by search engines.

Typical uses of the search engines include searching for information related to business, commercial, scientific, shopping, other professional and home needs. The purposes of using search engines may include shopping, seeking further information about professional needs (such as business and scientific needs), entertainment, downloading useful files, software, games, music, video streaming, etc.

Often these search engines have limitations in terms of providing adequate coverage or access to various web sites that are displayed and updated in a foreign language. The content of web pages that support only one or more foreign languages cannot be comprehended by foreign users when they visit a foreign land. For example, most search engines in local regions provide web links of web pages that are displayed or kept in the local language only. In addition, when traveling or foreign users seek information related to foreign lands, for tourism purposes for example, they often get web pages in local languages that they cannot read or use (if they get any meaningful web site search results at all by processing searches in a foreign language in a foreign locale).

For example when an American sales person, who speaks only English, visits Germany and searches for business related information for a sales related issue, the search engines that work locally in Germany often provide information only in the German language. Therefore, this German information that is provided is often unhelpful to the English-speaking user, and the sales person may not be able to conduct business successfully. In other circumstances, the search engines may provide web pages with some limited information provided in the English language, but these partial accommodations of foreign languages often lead to misinterpretations or slightly less reliance on the foreign language that may not satisfy the user's goals. Confusion may also occur if the English or foreign search terms are slang, difficult to translate or have multiple meanings in the local language(s) supported by the local Internet.

Some search engines provide translations of web pages, but these translations are not exact and do not provide clear information based on what was exactly written in the original language. The user often cannot search if there are no search terms entered in the local language in a local or new city. Also, the search-engine-provided translation services may not be available offline, when the user does not have access to the Internet. Therefore, a need exists to provide improve language support and international features to content and searches performed on the Internet.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 5 is a screen shot or snap shot of a web page in a local German language wherein, upon clicking on a web link in the search result page of FIG. 4, a web page translated to a target language (in this case English) is provided to the user in accordance with the embodiment of FIG. 1;

DETAILED DESCRIPTION OF THE DRAWINGS

Figure 1:
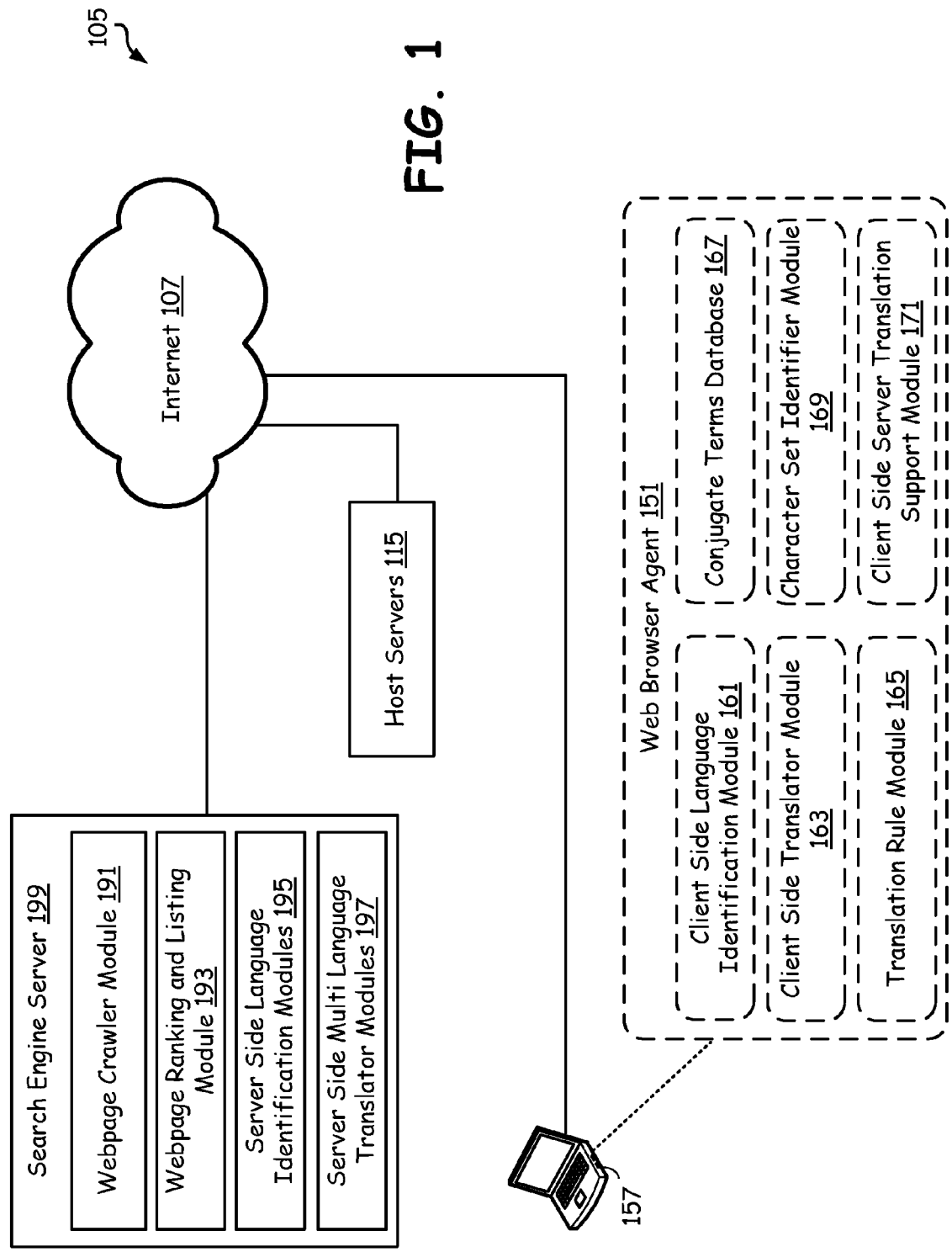
FIG. 1 is a schematic block diagram illustrating an Internet infrastructure that accesses a web page in one or more local/foreign languages and then utilizes the services of a web browser agent (and/or the search engine server's translation services) to translates to local/foreign language and display the content in another language.

FIG. 1 is a schematic block diagram illustrating an Internet infrastructure 105 containing a client device 157 connected to host servers 115 and search engine server(s) 199 over the Internet 107 or some other wireless, wire line, optical, and/or other similar public or private network. The client device 157 has a web browser (not specifically shown in FIG. 1) wherein the web browser incorporates a web browser agent 151, wherein the web browser utilizes the services of the search engine server 199 to access a web page in one language (a local language) and then utilizes the services of the web browser agent 151 alone or in conjunction with the search engine server's 199 translation services to translate content from a local language to another language (a foreign or target language). Once translation is complete, the system displays the translated language version with or without the original language version. Specifically, the web browser agent 151 is in one embodiment provided by the search engine server 199 as an auxiliary online/offline tool for language translation assistance for users of the client device 157. The web browser agent 151 contains a plurality of modules that translate a downloaded web page from a first language on an Internet based server or host servers 115 (which may also be downloaded via the search engine server 199 provided web links also) to a second language.

The first language may typically be a local language (for example, regional language for a visitor from a foreign land) and the second language may be a foreign language (for example, native language of the visitor in the foreign land). However, the possibility of having translation done from the first language to the second language among a plurality of supported languages (i.e., multi-language translation) is also considered, rather than just having a translation between only two supported languages. In other words, translation can occur in a dynamic manner between any of a plurality of base languages to any of a plurality of target languages. In this case, the web browser agent 151 may contain many more modules and may consume a larger share of memory in the client device 157, so that many different languages are supported. In other embodiments, a company, entity, or network may be such that only a predetermined number of languages require support. For example, a British company doing work in China may only need to deal with translation between English and Mandarin. In these cases, the system can limit the number of languages (and therefore modules) to a fixed and predetermined number without losing full functionality. The modules are generally firmware or software being stored in memory and run on one or more central processing units (CPUs).

The original web page can be downloaded from any host server 115 in the Internet, and typically this download occurs with content in the first (local) language. In one embodiment, that page is displayed on the screen of the client device 157 for the user to view. However, the user may not be able to comprehend the contents of the web page as it is in the original language, which is a local language the user may be unfamiliar with. For example, the user may be a foreign visitor who attempts to access a local web page for information or a person who accesses a web page belonging to a server 115 in a foreign land in an attempt to get information about organizations or any other local information (e.g., for vacationing or travel). The web page could be in the German language (local language) with a visitor from the Czech Republic, who speaks and reads only in a Czech language (foreign language).

The web browser agent 151, when downloaded from the search engine server 199 site and installed into the local computer (or any other client device 157), provides a toolbar on the top of the web browser screen containing buttons for enabling translation from a first language to a second language. In another embodiment, the web browser agent 151 may provide more language options for translation, thereby providing a multi-language translation mode.

The downloaded web page in the first (local) language can be translated either online with downloading and interacting with sites or offline after the connection to the network/Internet is complete. The translation processes the first language into the second (foreign) language by clicking a button in the toolbar (such as a button with title 'Translate to Second Language' or 'Translate to Target Language', In these embodiments, the second language can be replaced by any predetermine language such as English, German, French, Czech, Hindi, Chinese, Japanese, Spanish, etc., languages). The web browser agent 151 translates the web page to the second language when initiated by the user as mentioned above. Also, with the assistance of the web browser software, the system displays the translated web page in the second language on display screen of the client device 157 (in a separate window or in the same window where the web page was displayed).

A client side language identification module 161 is embedded in the web browser agent 151. In the case of multi-language translation scenario, the client side language identification module 161 identifies the first language by initially selecting a few characters, words, or strings in the web page. Then, the web browser agent 151 searches through a dataset in a database that contains a plurality of characters, words and strings from two or more languages along with language tags (and possibly, containing conjugate terms and strings in a plurality of other languages along with language tags, in case of multi-language translation scenario). In other embodiments, optical character recognition and pattern recognition algorithms may be used, and such processes may be most efficient for some dialects, such as Mandarin, Korean, Mongolian, etc., that may not be character or alphabet-based like German, English, or Spanish. Then, the web browser agent 151 translates the web page to a supported second language that the user is familiar with or has selected via the browser.

The translation services may be provided by the web browser agent 151. the agent 151 works in conjunction with the multi language translation services of the search engine server 199 or the services of any other server 115 that provides appropriate translation over the Internet 107. The web page is typically downloaded from an Internet-based host server 115 by clicking on a web link in a list of search results provided by the search engine server 199. The list of search results is usually provided in response to a query search string provided by the user in the second language. Therefore, translation is sometimes needed in the search process to find the appropriate search results, in addition to translation that may be needed before displaying selected search result content to the user. The web browser agent 151, in this case, identifies the language of the web page (the first language) by using a few terms from the web page and by utilizing services of the client side language identification module 161. Then, the web browser agent 151 delivers a web link of the web page, along with a tag of the first language, to the search engine server 199 for translation from the first language to another language (which could be any one or more of the user's selected languages). Server side multi-language translator modules 197 (a module incorporated into the search engine server 199), translates the web page from the first language to other language(s). Then, the search engine server 199 delivers the translated web page in the target or requested language to the web browser for display to the user.

To perform translations, the web browser agent 151 contains client side language identification module 161, client side translator module 163, translation rule module 165, conjugate terms database 167, character set identification module 169, and client side server translation support module 171.

The client side language identification module 161 identifies the first language by extracting a few strings, sentences, or words from the downloaded web page and using the conjugate terms database 167 or assistance of the character set identification module 169 to identify the original language that is encountered. In other embodiments, optical character recognition or shape/pattern recognition can be used to detect the language. In other embodiments, a web site may identify in the HTML or XML language coding (or other languages and data) the host language used for the enclosed content. In one embodiment, the conjugate terms database 167 consists of words and strings in a plurality of predetermined languages succeeded by a plurality of words and strings expressing precise or approximate meanings in rest of the predetermined languages, along with respective language tags.

Figure 3:
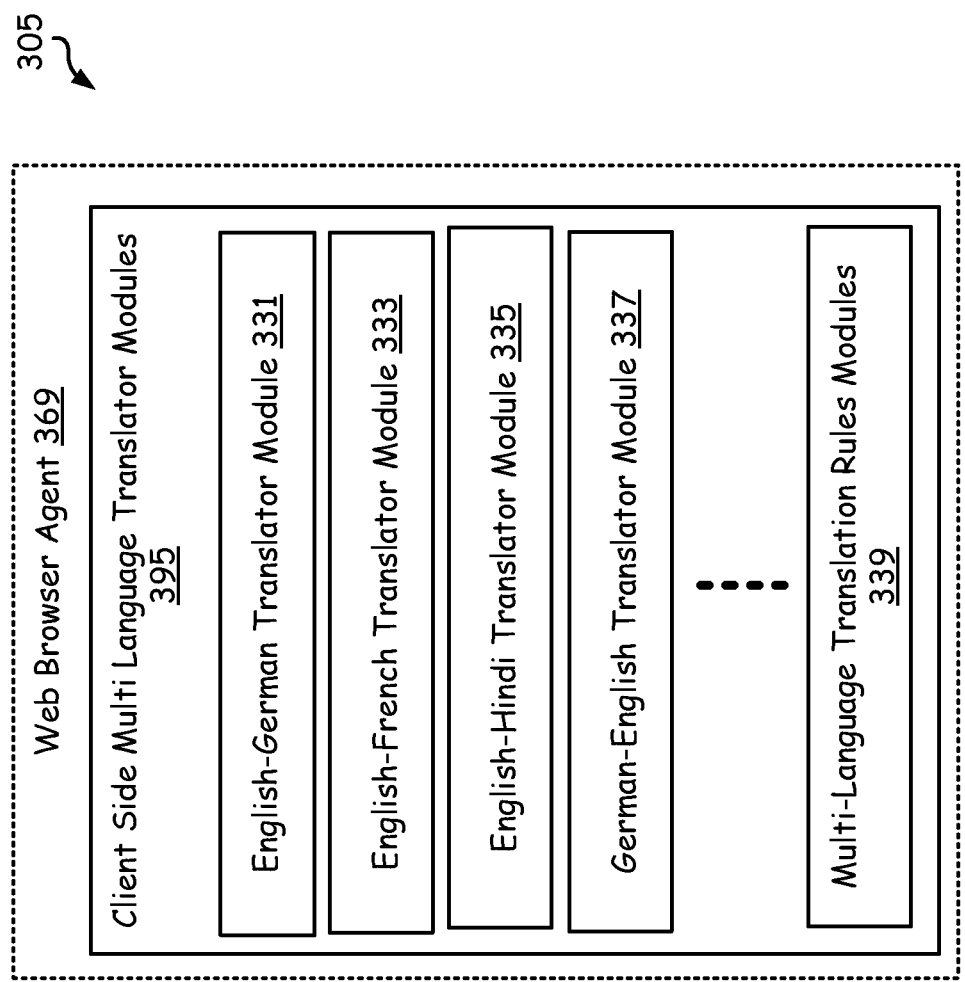
FIG. 3 is a schematic block diagram illustrating client side multi-language translator modules of the web browser agent of FIG. 1, in a multi language translation scenario, in more detail.

The character set identification module 169 includes alphabets in various languages succeeded by a language tag. The client side server translation support module 171 delivers the web link of the "web page to be translated" at the search engine server 199, along with tags of the first/original language and a target language, to the search engine server 199 for translation from the first language to the target language. The target language or languages are selected by the user by using a dropdown language selection menu in the toolbar or via some other user interface. The translation is done by the client side translation module 163 and is assisted and governed by the translation rule module 165 that contains the various algorithms, rules, and processes by which translation can be accomplished effectively and with high quality. the modules 163 and 165 could actually be a collection of multiple modules. This is especially true if multi-language translation support is provided by the web browser agent 151. FIG. 3 will provide for a detailed description of various client side multi-language translators.

To perform search operation and translation-related functionalities, the search engine server 199 contains web crawler module 191, web page ranking and listing module 193, server-side language identification module 195, and server side multi-language translator modules 197. The server side language identification module 195 determines a language of a web page by searching through conjugate terms databases (not shown in server 199, but similar or identical to database 167) embedded in the search engine server 199 and then retrieves appropriate language tag(s). Some pages or content may contain multiple languages, in the case of a multi-national site, in which case multiple languages need to be identified. The conjugate terms databases 167 contain strings and terms from all of the supported languages in one column along with a language tag in another column and a plurality of corresponding conjugate destination language strings and terms in a series of succeeding columns. The server-side multi-language translator modules 197 translate web pages in real time from the first/original language to the target language and deliver them to the web browser for viewing by a user. If there are four supported languages, for example, then twelve translator modules are employed to perform translations between all these two language combinations. Therefore, the server-side multi-language translator modules 197 may contain twelve translators, in this case. The client device 157 illustrated in FIG. 1 is communicatively coupled to the search engine server 199 via an Internet 107.

For example, assume a student understands only a Czech language but intends to study in Barcelona, Spain. If this student were to download a web page from a university site in Barcelona, the web page is probably provided in the Spanish language and the student is unable to comprehend this web page and obtain necessary information. The student, having access to the translation services of the search engine server 199, downloads the web browser agent or plug-in 151 from the website, and installs it in the computer's web browser. The student, before downloading the web browser agent 151, provides the information of the first language as Spanish language and the second language (to which it is necessary to be translated) as Czech language. This info may also be provided at the website of the search engine server 199. The user then receives appropriately configured and specialized web browser agent 151 that translates from Spanish language to Czech language. Meaning, a browser or plug-in can be configured for a specific first language to second language translation, may be configured for a plurality of language translations, for example, a plug-in that processes any one of four input language translated to any one of a targeted three languages. In yet another embodiment, the system can provide a plug-in or agent that can process any input language to any output/target language, however, this plug-in would likely be expensive, complex, and consume a lot of memory to enable, whereby a user may get all the functionality they need by simply selecting and installing translation capability for only a handful of languages.

In our example, after the installation is complete, the web browser agent 151 provides a toolbar at the top of the web browser that contains buttons to enable translation from the Spanish to Czech language as well buttons and dropdown menus that allow the student to utilize the multi-language translation services from various Internet sources including that of the search engine server 199. Therefore, regardless of being online or offline, the student may locally translate the downloaded and stored Spanish language web page to the Czech language.

Figure 2:
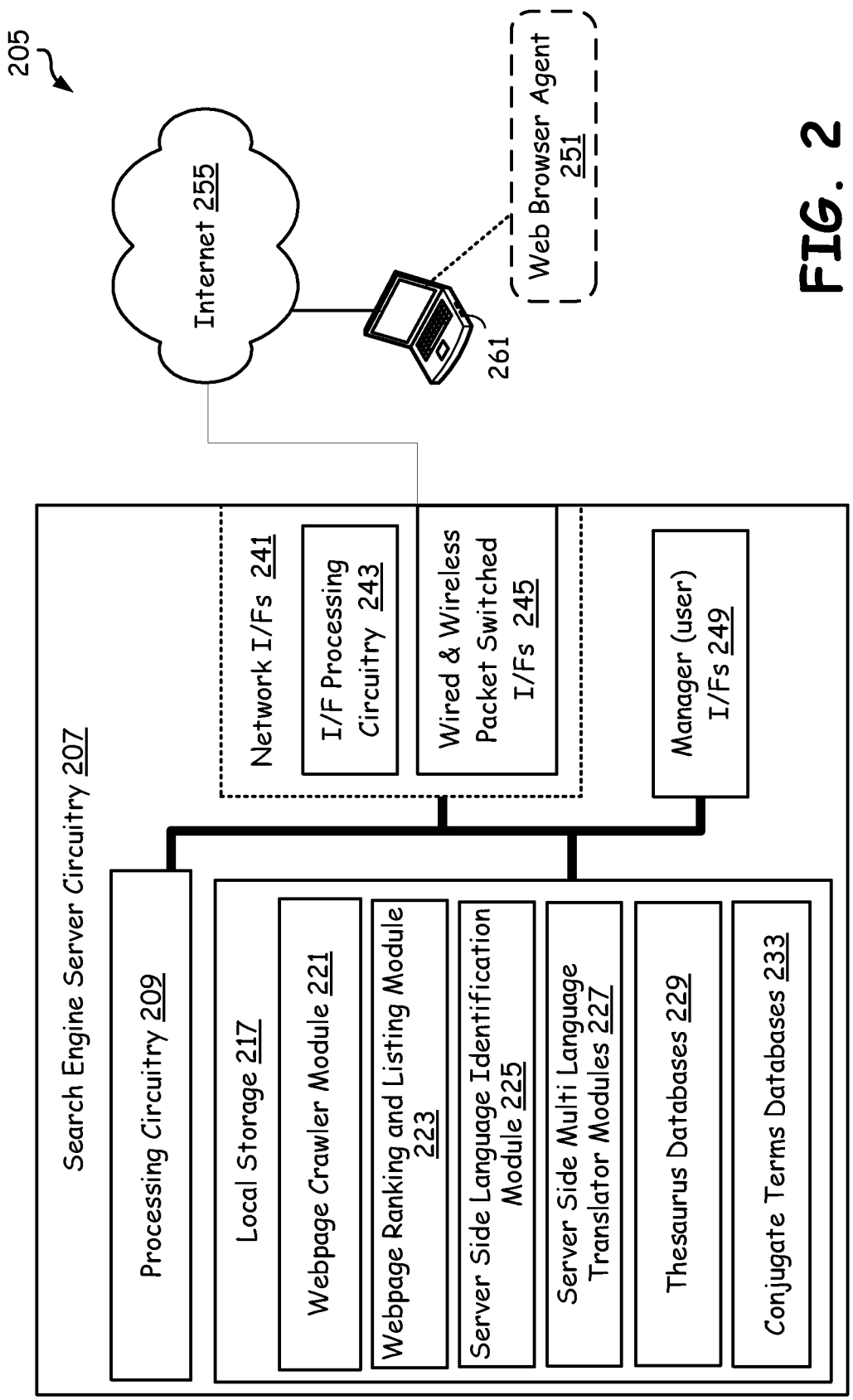
FIG. 2 is a schematic block diagram illustrating various components of the search engine server that provide translation services in accordance with FIG. 1.

FIG. 2 is a schematic block diagram 205 illustrating components or circuitry 207 of the search engine server 199 of FIG. 1. The search engine server circuitry 207 provides translation services, in conjunction with a web browser agent 251 (similar to the agent illustrated in FIG. 1) installed on a client device 261, constructed in accordance with the embodiments of FIG. 1 herein. The search engine server circuitry 207 may in part or full be incorporated into any computing device that is capable of serving as an Internet based search engine server, like server 199 of FIG. 1. The search engine server circuitry 207 generally includes processing circuitry or CPU(s) 209, local storage/memory 217, manager interfaces 249, and network interfaces 241. These components are communicatively coupled to one another via one or more of a system bus, dedicated communication pathways, or other direct or indirect communication pathways as shown in FIG. 2. The processing circuitry 209 may be, in various embodiments, a microprocessor, a digital signal processor, a graphics processor, a state machine, an application specific integrated circuit, a field programming gate array, combinations thereof, or other processing circuitry that is compatible with digital computing.

The network interfaces 241 contain wired and wireless packet-switched (and/or other) interfaces 245 and may also contain built-in or an independent interface processing circuitry or CPU(s) 243. The network interfaces 241 allow the search engine server 207 to communicate with client devices such as 261 and to deliver search result pages and provide translation services to the client device 261 over the Internet or another network 255, in conjunction with the web browser agent 251. The manager interfaces 249 may include a display and keypad interfaces. These manager interfaces 249 allow the user at the search engine server 207 to control operations in accordance with the present invention. The client device(s)

261 illustrated communicatively couple to the search engine server 207 via an Internet 255.

Local storage 217 may be random access memory, read-only memory, flash memory, a disk drive, an optical drive, or another type of memory that is operable to store computer instructions and data. The local storage/memory 217 stores instructions/data to instantiate a web page crawler module 221, a web page ranking and listing module 223, server side language identification module 225, server side multi-language translator modules 227, thesaurus databases 229, and conjugate terms databases 233. Often, these modules are software programs stored in storage or memory for execution by the processing circuitry 209. In other embodiments, these modules may contain custom hardware, custom peripherals, special input/output (I/O), etc. These modules 221, 223, 225, 227, 229, and 233 allow the web browser agent 251 to utilize the translation services of the search engine server 207, in addition to the usual search and result delivery operations of the search engine server 207. That is, the web browser agent 251 utilizes translation services of the search engine server 207 to translate a web page in real time from a first/original language to a target/foreign language (selected by a user at the client device 261) and deliver the translated web page to the web browser at the client device 261.

The web browser typically downloads the web page from an Internet-based host server (see servers 115 in FIG. 1) by clicking on a web link in a search results list found by the module 221 and provided for user viewing by the web page ranking and listing module 223 in response to a query search string in a search language. In another embodiment, searching and translation can be performed by directly accessing content from the host Internet server and/or by providing a web address for content from the browser. The web browser agent 251 identifies a language of the web page (the first/original language) and delivers the web link of the web page, along with tags of the first/original language and a target/foreign language, to the server-side multi-language translator modules 227 for translation from the first/original language to the target/foreign language (which could be any of the user selected language among the search engine server 207 supported or predetermined and supported languages). The server side multi-language translator modules 227 then translates the web page content from the first/original language to the target/foreign language and delivers the translated web page in the target language(s) to the web browser for display.

In a case where the first/original language tag is not received by the server-side multi-language translator modules 227, the server-side language identification module 225 determines that language either by searching through the conjugate terms databases 233, by identifying the domain name of the web page, or by optical character recognition and pattern processing. The server-side multi-language translator modules 227 contain a plurality of translators that support translation of web pages from one language to any of the other supported languages in real time and delivery of the translated pages to the web browser. If there are four supported languages, for example, then the server side multi language translator modules 227 may contain twelve translators, to perform translations from any original language to any of the other languages.

In other embodiments, the search engine server 207 of FIG. 2 may include fewer or more components than are illustrated as well as lesser or further functionality. In other words, the illustrated search engine server is meant to merely offer one example of possible functionality and construction in accordance with the present invention.

FIG. 3 is a schematic block diagram 305 illustrating client-side multi-language translator modules 395 of the web browser agent 369 (similar to agent 151 of FIG. 1), in a multi-language translation scenario. The web browser agent 369 contains a plurality of client-side multi-language translator modules 395 that translate web pages in real time or off-line from a first language to a second language among all of the supported languages and displays these translations on screen using tools in the web browser of a client device. In all, if there are four supported languages, for example, then twelve real time translators are employed to perform translations from any original language to any of the remaining target languages. Therefore, the client side multi-language translator modules 395 may contain twelve translators, in this case, but may contain 2 modules, twenty modules, hundreds of modules, or thousands of modules in other embodiments.

The client side multi-language translator modules 395, for example, may contain English-German translator module 331, English-French translator module 333, English-Hindi translator module 335 (and so on, covering all other supported languages, that is, English to all other target languages that need translator modules), and German-English translator modules 337 (and again covering all other desired supported target languages, that is, German to all other languages translator modules). All two-language combinations need not be supported, for example, English to all the other languages can be supported, but only translation from German to English is supported with English as a target language, for example. These translator modules 331, 333, 335, and 337 function in real time and/or can be programmed to passively operate off-line or when selected or enabled by a user or some other event other than the access to a page or internet content of interest.

For example, a user at the client device of FIG. 1 or 2 may download a web page in the first (local) language and then translate the page using translator modules 331, 333, 335, and 337. The translator modules of FIG. 3 translate the downloaded web page after downloaded or during the reading of the page over the Internet (and whether while being online or offline) into the second (foreign/target) language by clicking or selecting one or more buttons in the toolbar or some other event, provided by the web browser agent 369. The buttons may have a title such as 'Translate to Second Language' and the second language can be selected among any of the predetermined languages such as English, German, French, Czech, Hindi, or Chinese languages using pull-down menus or other interfaces. And, the language available to the system for original language recognition and target language translation may be selected by the user and added or deleted from in the future. To select the second/target/foreign language, the web browser agent 369 may provide a dropdown language selection menu in the toolbar or some other interface. The client-side multi-language translator modules 395 translate the web page to the second/target language when initiated by the user as mentioned above and, with the assistance of the web browser software, displays the translated web page in the second language on screen of the client device. The translations done by the client-side multi-language translator modules 395, such as translator modules 331, 333, 335 and 337, are assisted and governed by multi-language translation rule modules 339 which contains specific rules, processes, algorithms, special-cases, etc that assist in the translation processes.

Figure 4:
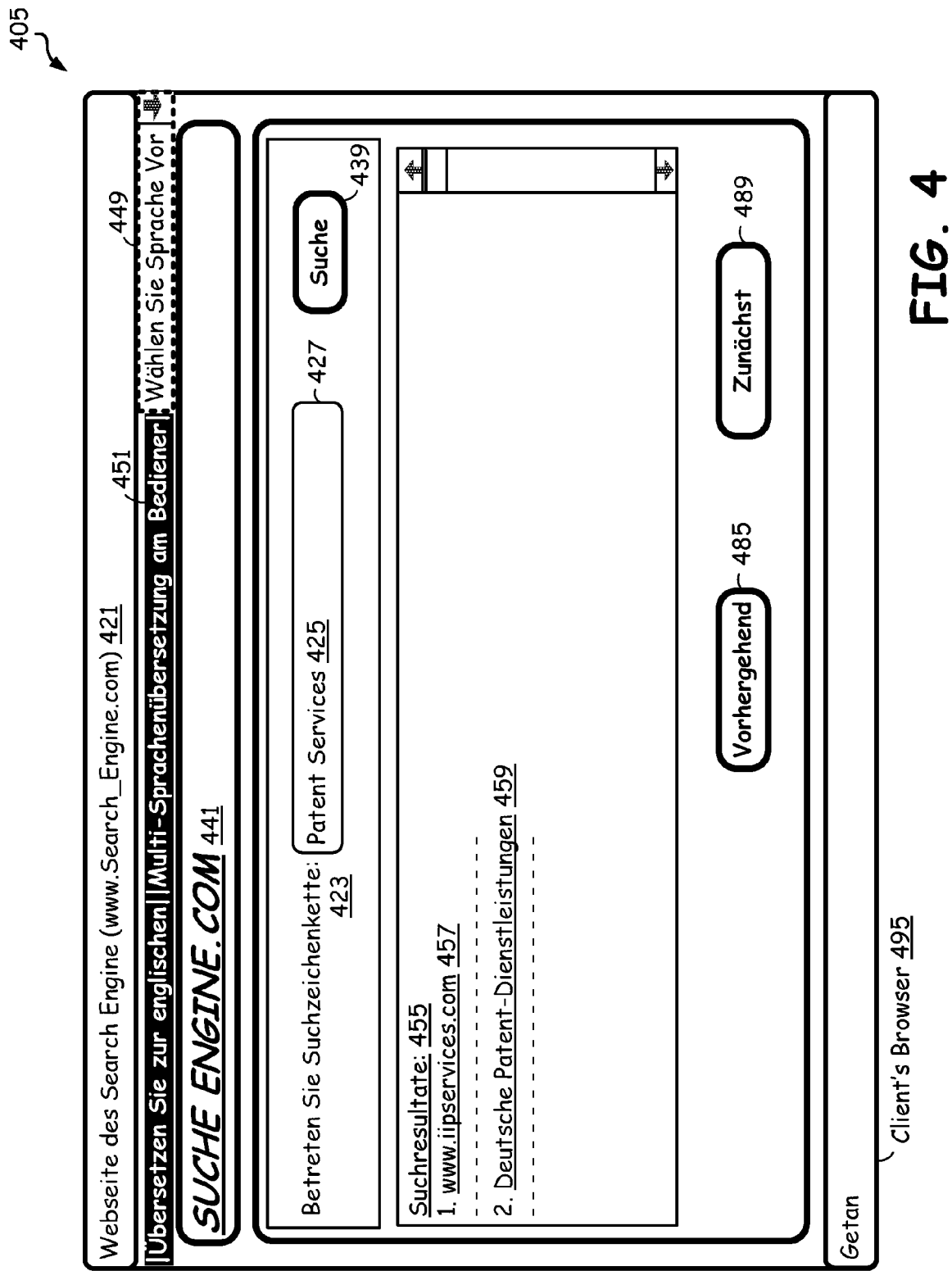
FIG. 4 is a screen shot or snap shot of a search result page containing web links of web pages in accordance with the embodiment of FIG. 1.

FIG. 4 is a snap shot of a search result page 405 containing web links of web pages in accordance with the embodiment of FIG. 1. Specifically, the snap shot illustrated in FIG. 4 shows a search result page 405 delivered to client device browser 495 (a web browser and this snap shot presumes a German original language browser). FIG. 4 contains a search result list 455 in the selected source/original language (German, in this example) as shown via web links 457 and 459. These links are displayed on web browser screen in response to a search string of enquiry, which in this example is 'Patent Services' 425, typed in English into the browser. These links 457 and 459 vector to web pages in their respective host servers in German language. To get these search results, the system has to translate patent services into a German searchable construct and find correlating web sites as search results. Then, these search results are presented to a user (and can be done in another target or foreign language as taught herein). Then, as the user selects interesting search results, the system translates that content before providing it to the user. Sometimes translation will require some post processing that is graphical or spatial, as some language read right to left and some read left to right, and other languages are shorter or longer than original languages when translated. Therefore, some graphical or spatial correction may be needed.

The search result page 405 delivered may contain a page title such as 'Search Engine's Web Page (www.Search_Engine.com)' 421, in the German language. It may also contain a title such as 'SEARCH ENGINE.COM' 441 (again, in the German language) and a tool bar 451 provided by the web browser agent (containing two buttons, titled 'Translate to English' and 'Multi-Language Translation at Server', all in German language). A language selection tool 449 is also provided, that allows user to choose a destination language (titled 'Select Language', in German language). In other embodiments, the interface may provide for a change in the original language, thereby allowing the German contained on this page to be converted to another language, such as English or French. A text entry such as 'Enter Search String:' 423 (in German language) and text box 427 are provided to facilitate user's further search, in one of the windows, and in this search area is entered the search string "Patent Services" 425 in FIG. 4. This window also contains a 'Search' 439 button (displayed in German language) to initiate a search operation.

In the snap shot of FIG. 4, the search result page 405 shows results for the search string 'Patent Services' 425 (entered in English language, for example, by a foreign visitor). Again, if a user is having a hard time interfacing to the screen of FIG. 4 given German language difficulties, the user can be prompted in English on FIG. 4 to convert the screen of FIG. 4 to another language for improved comprehension by the user. The search results based upon the English string 'Patent Services' is provided in a second window such as links 457 and 459. Search results are provided in the window having a title 'Search Results' 455 and results may be displayed in German language. Again, if the user cannot read these results, the user may opt to have these links and search result sections translated to another language, in this case, likely English since the search string is entered in English. The search result page 405 and client browser page 495 shown in FIG. 4 also contains the 'prev' 485 and 'next' 489 buttons (displayed in German language) to access prior displayed search result pages and the subsequent search result pages, respectively.

FIG. 5 is a snap shot 505 of a web page in a local (German) language. FIG. 5 shows FIG. 4 as it would look upon clicking on a web link in the search result page of FIG. 4. the information on FIG. 4 is superimposed with a web page translated to a foreign (English) language by the web browser agent of client device in FIG. 5, in accordance with the system configuration and embodiment of FIG. 1. Specifically, the snap shot 505 illustrated in FIG. 5 shows two web pages, one superimposed on another. The one web page 511 that is underneath (only partly visible in the FIG. 5 illustration) is a web page in German language, downloaded from an Internet server in response to the clicking of a web link 'www.iipservices.com' in FIG. 4. This web page contains a page title in German language—equivalently in English 'Search Engine's Web Page (www.Search_Engine.com)' 511. And, a web browser agent provides a toolbar containing tools for translating the page and related content to English and performs additional multi-language translation at the server, followed by a language selection dropdown menu. The illustration of the underneath web page 511 in German language shows a title and a text in German language (only partly visible in illustration).

As a result of a user clicking on a button for translating to English, the superimposed web page in the client browser 595 (i.e., an English translated web page, fully visible in the illustration) is constructed by the web browser agent. After translation to English is complete, the English information is displayed on another window as shown in FIG. 5. Again, spatial, graphical, and other screen processing may need to occur to render the English version readable as compared to the German version. The translated web page contains a page title 'IIP Service's Web Page (www.iipservices.com)' 521 (translated from German to English language). It also contains a title such as 'IIP SERVICES.COM' 541 (again, translated from German to English language) and a tool bar 551 provided by the web browser agent (containing two buttons, titled 'Translate to English' and 'Multi-Language Translation at Server', all displayed in English language). A language selection tool 549 is also provided, and this tool allows user to choose a destination language (titled 'Select Language', displayed in English language).

The translated web page shows translated text in the web page in another window, displayed in the English language. Note, even within a single language, there may be versions. For example, English is slightly different in the US verses England versus Australia. The same is true for Spanish and other languages. Therefore, a single language may have different translation processes for a target area, demographic, or country. A title for the translated text is also provided for the user's benefit, such as 'Translated Text (From German to English)" 555. The illustration also shows a translated English language text 557. The translated web page also contains the 'prev' 585 and 'next' 589 buttons (displayed in English language) to access prior displayed search result pages and the subsequent search result pages, respectively.

Figure 6:
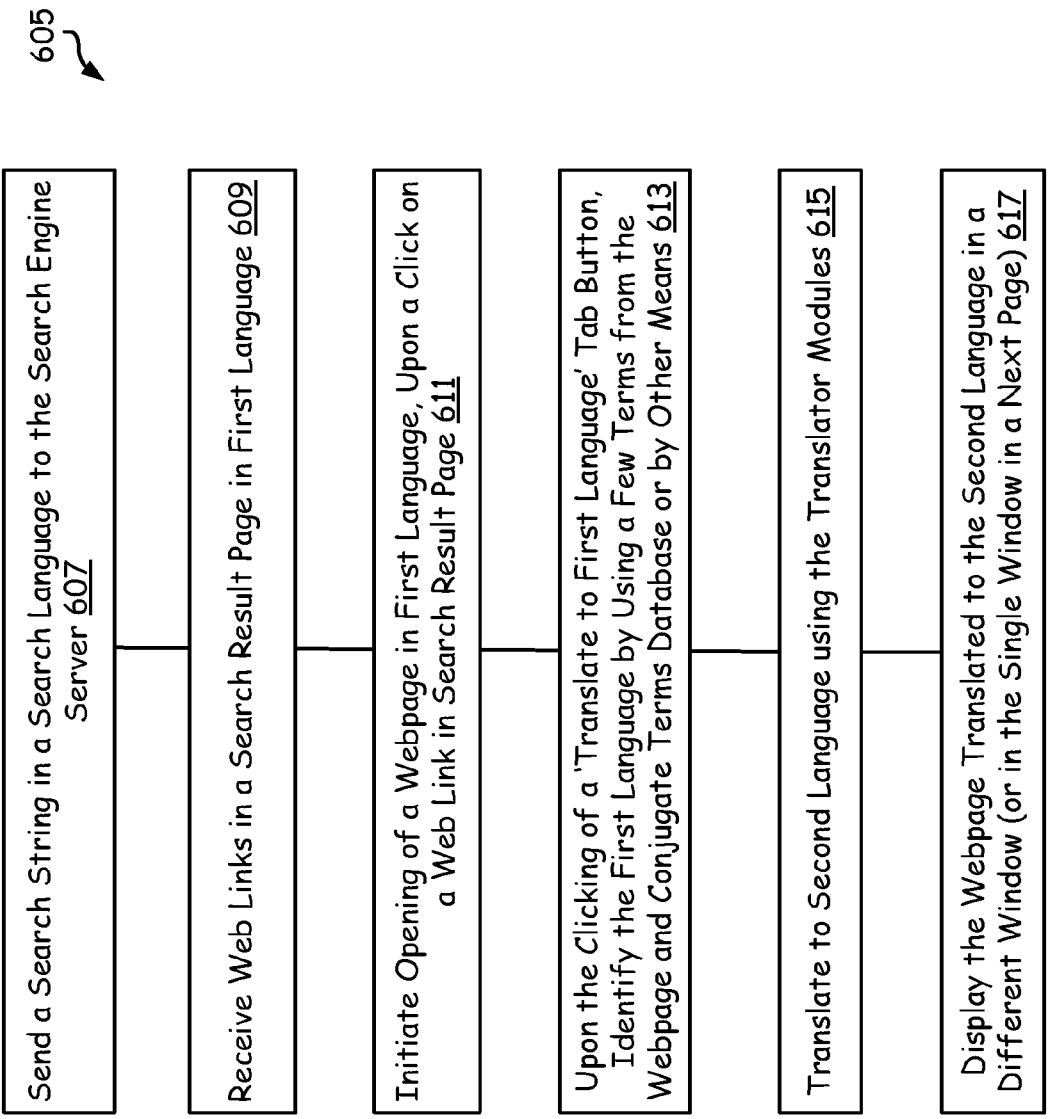
FIG. 6 is a flow diagram illustrating the translation process functionality of the web browser and web browser agent of FIG. 1.

FIG. 6 is a flow diagram 605 illustrating the functionality of the web browser and web browser agent of FIG. 1, during a translation process. The functionality 605 begins at a block/step 607, where the web browser sends a search string in an entry language to the search engine server. Then, at a next block/step 609, the web browser receives web links in a search result page in an original language. At a next block/step 611, the web browser initiates the opening of a web page in the original language, upon a user at the client device clicking on a web link in the search result page. Then, the opened web page in the original language is displayed on the screen, by the web browser.

For example, a foreign visitor to Germany, who understands English only, may intend to search for web links in a local language (say, in German language, the first/original language) and provides a search string in web browser in English (the second/entry/search language) and as a result obtains the search results that vector to German language web pages. Then, the user utilizes the services of the web browser agent to translate an opened web page to an English language (that is, from the first/original language to the second/entry/target language)

Upon a click from the user on a button provided by the web browser agent (such as a 'Translate to First Language' Tab Button) to translate from the first/original language to the second/target language, at a next block/step 613, the web browser agent identifies the first language (the language of the web page) by using few terms from the web page and utilizing a conjugate terms database or by other means. The conjugate terms database consists of words and strings in a plurality of predetermined languages succeeded by a plurality of words and strings expressing precise or approximate meanings in rest of the predetermined languages, along with respective language tags. The other means of identifying the language of the web page may include identifying the language tag of few characters in the web page by using a database containing alphabets in various languages succeeded by language tags or by identifying the domain name of the web page, or by character recognition, pattern recognition, language tag requirements in HTML/XML, etc.

At a next block/step 615, the web browser agent translates the web page to the second/target language, by using translator modules that are built-in to the system. At a next block/step 617, the web browser agent displays the web page translated to the second/target language, with the help of tools in web browser, and in a different window (or in the single window in a next page) in one embodiment.

Figure 7:
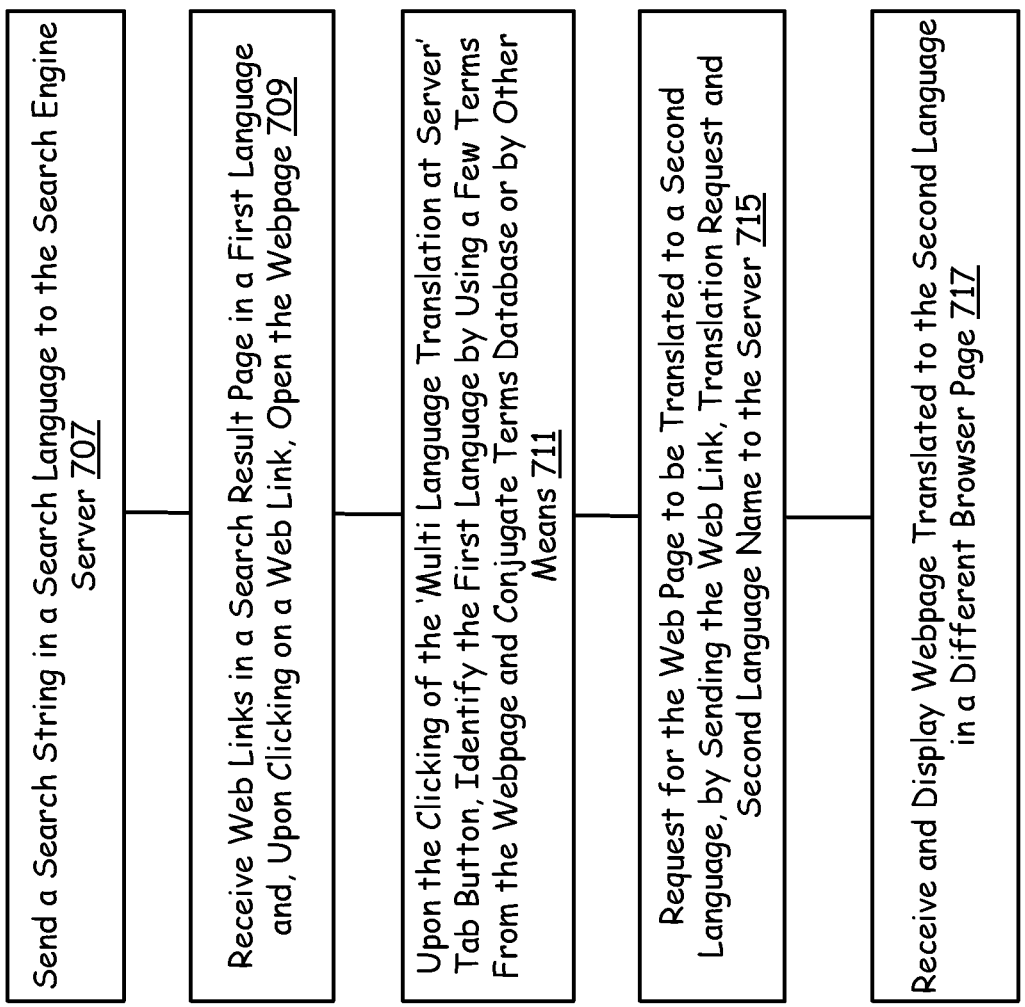
FIG. 7 is a flow diagram illustrating the functionality of the web browser and web browser agent of FIG. 1 during a translation process that occurs in conjunction with a search engine server's translation services.

FIG. 7 is a flow diagram 705 illustrating the functionality of the web browser and web browser agent of FIG. 1. The functionality 705 illustrated in FIG. 7 is the functionality during a translation process that occurs in conjunction with search engine server's translation services. The functionality 705 begins at a block/step 707, where the web browser sends a search string in a second language to the search engine server of FIGS. 1-2. At a next block/step 709, the web browser receives web links in a search result page in first/original language and upon clicking on a web link in search result page the web browser opens the web page in the first/original language.

At a next block/step 711, upon clicking 'multi language translation at server' tab button, the web browser agent identifies the first/original language (the default language of the web page) by using few terms from the web page and conjugate terms database or by other means taught herein (such as, by identifying the language tag of few characters in the web page by using a database containing alphabets in various languages succeeded by language tags or by identifying the domain name of the web page). At a next block/step 715, the web browser agent requests for the web page to be translated to another language (which may be different from the search string language that was used or the original language used by the web content). Translation is requested by sending web link of the web page, translation request, and target language name to the search engine server. At a final block/step 717, the web browser receives and displays the web page content as translated to the target language in a different browser page or window.

For example, the web browser may download the web page from an Internet-based host server by clicking on a web link in search results provided by the search engine server in response to a query search string in English language (the second/entry language) or by directly accessing from the host internet server by providing web address. Then, the web browser agent identifies language of the web page (German language, the original language, for instance) and delivers the web link of the web page, along with tags of the German language and English language (a target language, which may also be any other language rather than English), to the search engine server for translation from the German language to the English language.

The search engine server in turn translates the German language web page to an English language and delivers the translated English language web page to the web browser for display. If the German language tag is not received by the search engine server, then the search engine server determines the language either by searching through the conjugate terms databases or by identifying the domain name of the web page. The search engine server contains a plurality of translators that support translation of web pages from one language to any of the other supported languages in real time and deliver them to the web browser.

Figure 8:
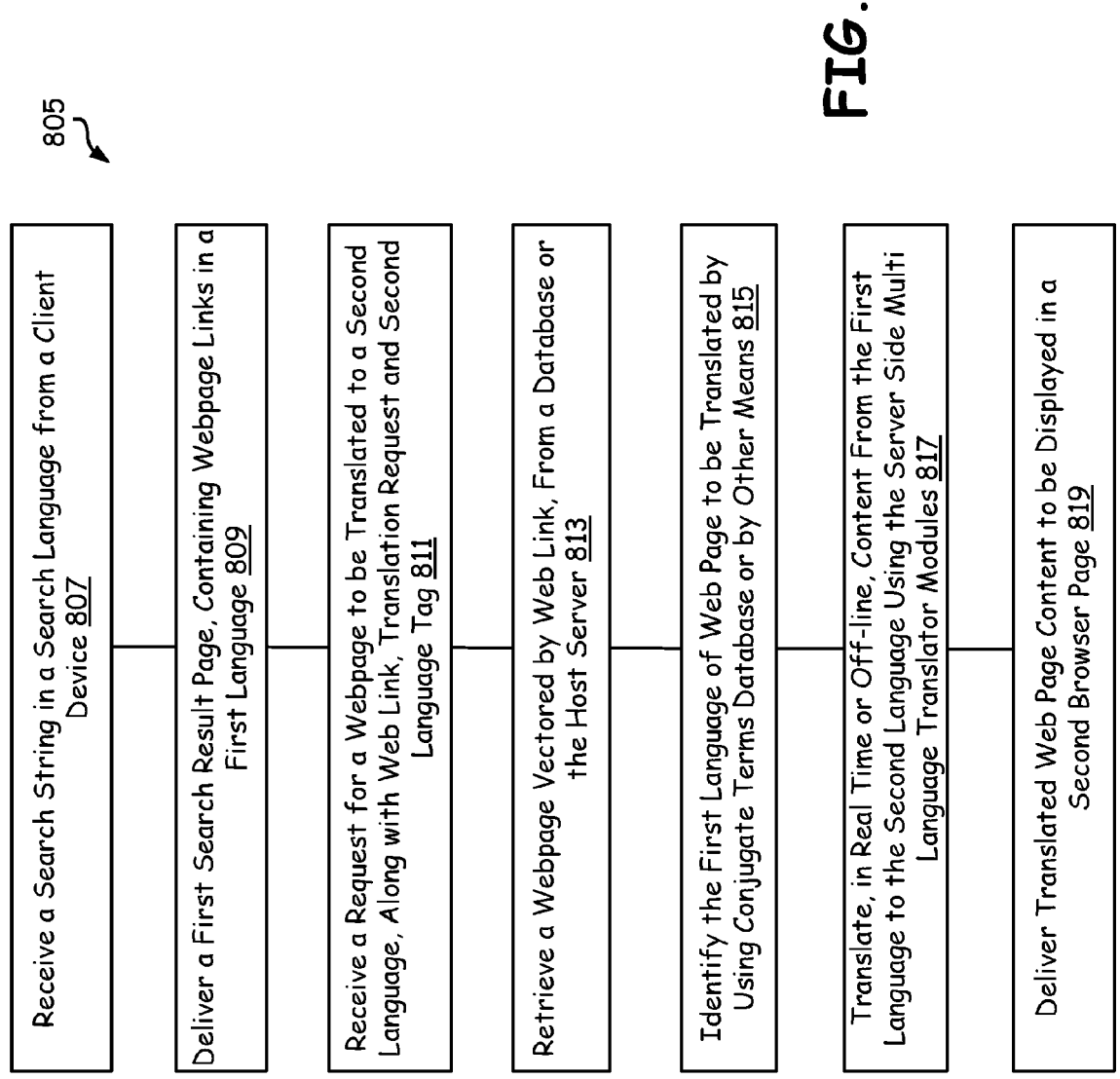
FIG. 8 is a flow diagram illustrating the functionality of the search engine server of FIG. 1 during a translation process that is initiated by a web browser agent in a client device.

FIG. 8 is a flow diagram 805 illustrating functionality of the search engine server of FIG. 1 during a translation process that is initiated by a web browser agent in a client device. The functionality 805 begins at a block/step 807, when the search engine server receives a search string in a second/target language from the client device. At a next block/step 809, the search engine server delivers a first search result page, containing web page links in a first/original language. Then, at a next block/step 811, the search engine server receives a request for a web page to be translated to a third/final language, along with web link, translation request, and third/final language tag.

At a next block/step 813, the search engine server retrieves the web page vectored by the web link, from a cache database or Internet based host server. Then, at a next block 815, the search engine server identifies the language tag of the web page to be translated by using conjugate terms database or by other means taught herein (i.e., identification of the language tag of characters in the web page by using a database containing alphabets in various languages succeeded by language tags or identification of language tag by determining the domain name of the web page). At a next block/step 817, the search engine server translates in real time from the first/original language to the third/final language using server side multi language translator modules. Finally, at a final block/step 819, the system delivers translated web page to be displayed in a second browser page.

For example, the search engine server (as soon as it receives a web link of a web page (say, Spanish language) and information along with the first language tags (Spanish language) and the third language (say, Czech language) tags and a request for translation) identifies the Spanish language tag belonging to the web page by searching through conjugate term databases embedded in the search engine server and then retrieves the Spanish language tag. The conjugate terms databases, for example, contains many strings and terms from the Spanish language (along with all other supported languages) in one column along with Spanish language tags in another column and a plurality of corresponding conjugate English language strings and terms (as well as that of all other supported languages) in a series of succeeding columns. The language identification may also take other forms. Then, the search engine server translates the Spanish language web page in real time to English language and delivers it to the web browser.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may include general or specific purpose hardware, or may include such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module may or may not modify the information of a signal and may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof. Although not specifically shown herein, the client devices taught in FIGS. 1-2 have memory, network interface circuitry, and memory/storage in a manner similar to any consumer client device (such as a printer, cell phone, PDA, etc) or any personal computer, server, or mobile computer device. Therefore, the client devices taught herein have similar computer internal components as shown for the server in FIG. 2 herein whereby the web agent 151 and related software components are rendered functional by a CPU, memory, and/or I/O circuitry. It is also important to note that the web content translation steps, search string translation processing, language identification processing, etc., can be performed by a smart client device or by one or more servers in a centralized cloud computing environment. Therefore, all the functions and features taught for a client device herein may also be performed on a search engine server device or some other server, and vice versa.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A non-transitory, computer-readable storage medium storing computer program code, the computer program code comprising instructions executable by a first device of a first user to perform a method for interacting with a web search infrastructure, the first user having a preference for reading text of a first language, the web search infrastructure gathering both first web text of a second language and second web text of a third language, the method comprising:

directing the first device to automatically identify the second language within first search results received from the web search infrastructure, the first search results including at least a portion of the first web text, the automatic identification of the second language being performed using a web browser agent comprising a plurality of translation modules configured to provide auxiliary language translation assistance for different languages, wherein at least a portion of the web browser agent is provided from the web search infrastructure before receiving the first search results;

wherein the browser agent is further configured to provide a toolbar on a web browser screen, the toolbar including buttons for enabling translation from the first language to at least the second language;

directing the first device to automatically identify the third language within second search results received from the web search infrastructure, the second search results including at least a portion of the second web text;

directing the first device to respond to the identification of the second language by offering to the first user via the first device remote language-translation processing services to be conducted by the web search infrastructure;

directing the first device to respond to the identification of the third language by offering to the first user via the first device local language-translation processing services to be conducted by the first device; and presenting the translation results on the first device, wherein the translation results are determined by using a conjugate terms database, wherein the translation results include results having meanings that differ from one another due to alternate meanings of a search string in the first language used to produce the first web text of the second language and the second web text of the third language.

2. The non-transitory, computer-readable storage medium of claim 1, the method further comprising directing the first device to perform the local language-translation services.

3. The non-transitory, computer-readable storage medium of claim 1, wherein the web search infrastructure does not support translations involving the third language.

4. The non-transitory, computer-readable storage medium of claim 1, wherein the local language-translation services are performed offline.

5. The non-transitory, computer-readable storage medium of claim 1, the method further comprising directing the first device to send a translation request to the web search infrastructure, the translation request identifying the second language.

6. The non-transitory, computer-readable storage medium of claim 1, the method further comprising directing the first device to receive second language related data.

7. A non-transitory, computer-readable storage medium storing computer program code, the computer program code comprising instructions executable by a first device of a first user to perform a method for interacting with a web search infrastructure, the first user having a preference for reading text of a first language, the web search infrastructure gathering first web text of a second language, the method comprising:
- directing the first device to receive a second language related delivery comprising second language related data from the web search infrastructure, wherein the second language related delivery comprises digital delivery of at least a portion of a browser agent configured to provide a toolbar on a web browser screen, the toolbar including buttons for enabling translation from the first language to at least one second language; and
- directing the first device to perform translation related processing using the second language related data in at least a portion of the translation related processing, the translation related processing including:
  - (i) automatically identifying, based on the second language related data, the second language within first search results received from the web search infrastructure, the first search results including at least a portion of the first web text, and the second language related data being received before receiving the first search results; and
  - (ii) managing a translation from the second language to the first language relating to the first web text;
  - (iii) presenting the translation results in the new window, wherein the translation results are determined by using a conjugate terms database, and wherein the translation results include results having meanings that differ from one another due to alternate meanings of a search string in the first language used to produce the first search results.

8. The non-transitory, computer-readable storage medium of claim 7, wherein the managing the translation comprises performing the translation locally on the first device.

9. The non-transitory, computer-readable storage medium of claim 7, wherein the managing the translation comprises performing the translation remotely on the web search infrastructure.

10. The non-transitory, computer-readable storage medium of claim 8, wherein the web search infrastructure does not support the translation.

11. The non-transitory, computer-readable storage medium of claim 7, wherein the computer program code comprises web browsing code.

12. The non-transitory, computer-readable storage medium of claim 7, wherein the automatic identification involves an analysis of only a portion of the second language text in the first search results.

13. The non-transitory, computer-readable storage medium of claim 7, the method further comprising directing the first device to receive a third language related delivery from the web search infrastructure to support translation of the third language on the first device.

14. A web search system that supports a plurality of users via an Internet, a first user of the plurality of users having a preference for reading first language text via a first device, the web search system gathering first web text of a second language, the web search system comprising:
- a processing infrastructure that sends to the first device, prior to delivery of first search results, a translation process related delivery comprising at least a portion of a web browser agent configured to use a plurality of different translation modules to provide auxiliary language translation assistance for different languages;
- the processing infrastructure receives a first search request and responds by delivering the first search results to the first device to enable on the first device an automatic language analysis process that is based at least in part on the translation process related delivery, the receipt of the first search request occurring after the translation process related delivery;
- the processing infrastructure receiving a translation request constructed based on an identification by the first device that the first search results contains text of the second language for translation to a first language, the identification being based at least in part on the automatic language analysis process;
- the processing infrastructure translating the first search results using at least a conjugate terms database to produce translation results, the translation results include results having meanings that differ from one another due to alternate meanings of a search string in the first language used to produce the first search results;
- the processing infrastructure directing the first device to open a new window for presentation of the translation results; and
- the processing infrastructure transmitting the translation results to the first device for presentation in the new window.

15. The web search system of claim 14, wherein the automatic language analysis process involves an analysis of only a portion of the second language text in the first search results.

16. The web search system of claim 14, wherein the translation process related delivery supports identification of the second language on the first device.

17. The web search system of claim 14, wherein the translation process related delivery supports translation of a third language on the first device.

18. The web search system of claim 14, wherein the translation process related delivery comprises a client browser program code related delivery.

19. The web search system of claim 14, wherein the translation process related delivery comprises a second language related data.

20. The web search system of claim 14, wherein the translation request identifies at least one of the source language and the destination language.

21. A web search infrastructure that supports a plurality of users via an Internet, a first user of the plurality of users having a preference for reading first language text via a first device, the web search system gathering first web text of a second language, the web search system comprising:
- a client side program that directs operations of the first device to support web browsing and related language translation;
- a central processing infrastructure that delivers to the first device second language related data and first search results that include the first web text, the second language related data is delivered before the first search results are delivered, wherein the second language related delivery comprises digital delivery of at least a portion of a browser agent configured to provide a translation-related toolbar on a web browser screen;
- the client side program directs the first device to apply a language analysis process based on the second language related data to identify a portion of the first web text as being of the second language;
- the client side program directs the first device, based at least in part on the identification, to deliver a translation request to the central processing infrastructure, the translation request identifying a source language as the second language and a destination language as a first language;

the central processing infrastructure produces translation results in response to the translation request using at least a conjugate terms database, wherein the translation results include results having meanings that differ from one another due to alternate meanings of a search string in the first language used to produce the first search results; and the client side program directs the first device to present the translation results.

22. The web search infrastructure of claim 21, wherein the client side program is downloaded by the first device from a system that supports the web search infrastructure.

23. The web search infrastructure of claim 21, wherein the client side program comprises browser software that is tailored to interact with the central processing infrastructure to support an overall translation solution relating to web searching.

24. The web search infrastructure of claim 21, wherein at least a portion of the client side program comprises a software module that operates with a web browsing application that runs on the first device.

25. The web search infrastructure of claim 21, wherein the central processing infrastructure performs translation to service the translation request and to translate search input text.

26. The web search infrastructure of claim 21, wherein the client side program directs the first device to deliver the translation request based also on receiving a confirmation input from the first user.

27. The web search infrastructure of claim 21, wherein the client side program directs the first device to apply the language analysis process to a second search results which results in an identification of a third language text which is translated within the first device to the first language.

28. The web search infrastructure of claim 21, wherein the language analysis process is performed automatically in response to receiving the delivery of the first search results.

\* \* \* \* \*